Figure 3:
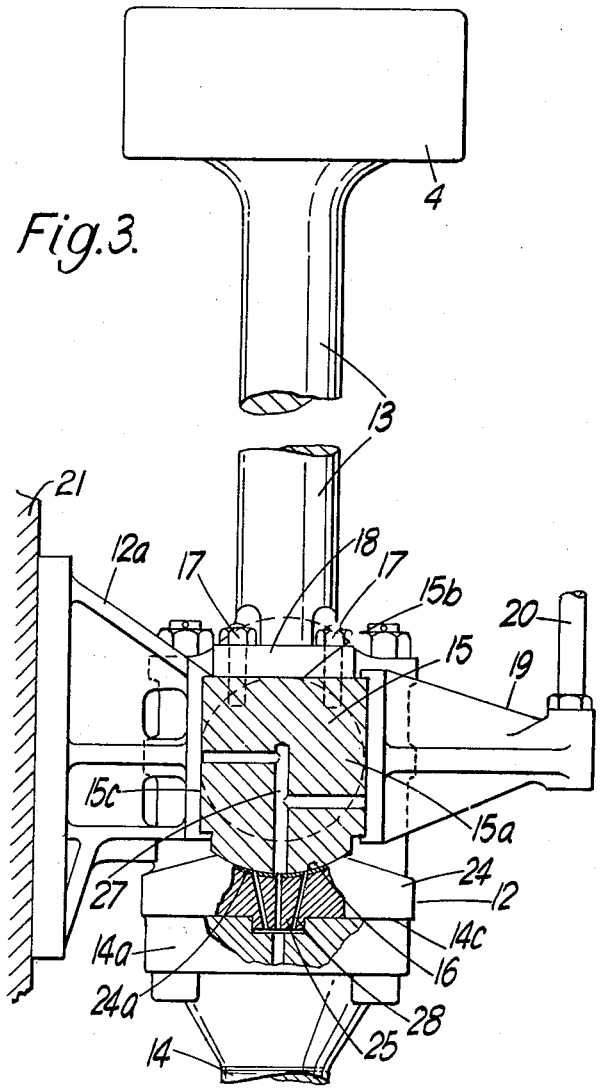

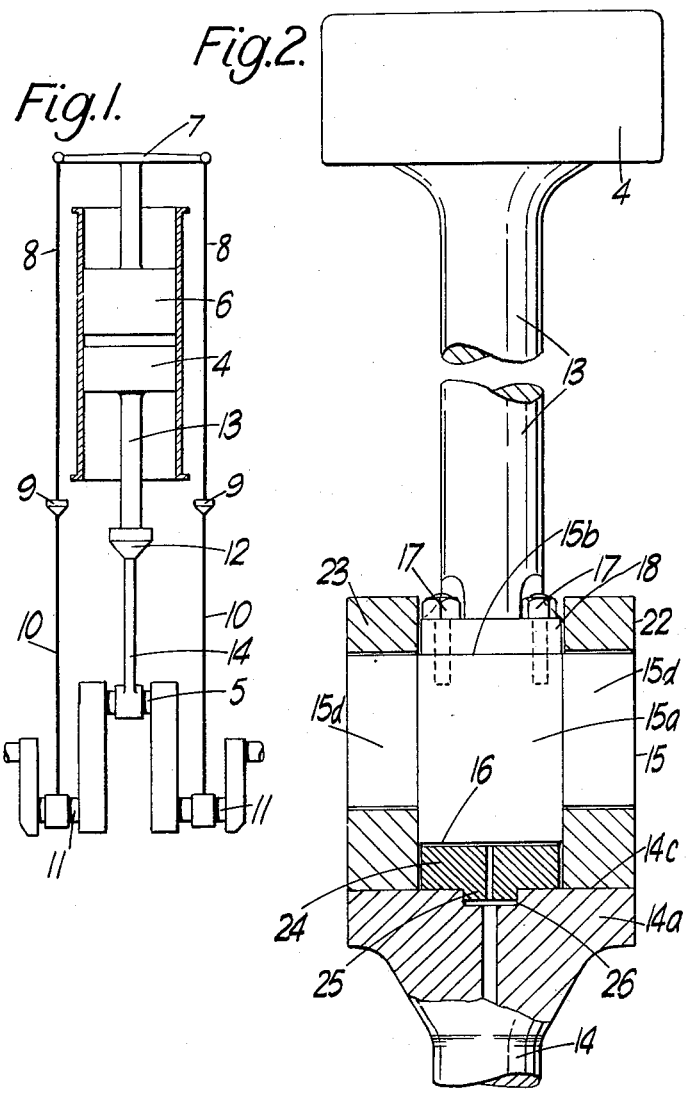

April 18, 1961 P. JACKSON 2,979,967
PISTON ENGINES

Filed May 6, 1959 2 Sheets-Sheet 2

United States Patent Office 2,979,967
Patented Apr. 18, 1961

2,979,967

PISTON ENGINES

Percy Jackson, Sunderland, England, assignor to William Doxford & Sons (Engineers) Limited, Sunderland, England, a British company Filed May 6, 1959, Ser. No. 811,387

Claims priority, application Great Britain June 4, 1958

2 Claims. (Cl. 74—579)

The invention relates to piston engines of the kind having a piston rod articulated to a connecting rod at a cross-head guided for rectilinear motion.

According to the invention an engine of the above kind is characterized in that the connecting rod has a bearing pad in line with the axis of the piston rod and engaging the end of the piston rod, or a transverse cross-head pin attached thereto, for the purpose of transmitting thrust from the piston rod directly to the connecting rod.

The engine, in its practical form, also has, at the sides of the bearing pad, annular bearings engaging the ends of a cross-head pin.

The invention has the advantage, in relation to engines of the usual construction in which the connecting rod is forked and has bearings only in the fork arms for engaging the ends of a cross-head pin, the piston thrust being applied to the centre of the pin, that the shear and bending loads on the pin and the consequential deformation thereof and unequal wear of the bearing areas, are reduced.

Preferably, in carrying out the invention, the head of the connecting rod is constructed as a transverse platform, without a fork, the bearing pad is formed or supported by the center of the platform and bearing blocks for engaging the ends of a cross-head pin are secured to the platform at each side of the pad.

According to a preferred feature of the invention there is a cross-head pin which at its center portion, has the cross-sectional shape of a cylinder cut away to form two flat faces at right angles, one face being attached to the piston rod and the other to the cross-head, the remaining arcuate surface engaging the bearing pad. A third flat face at right angles to that attached to the piston rod may also be provided for attachment of a bracket supporting cooling and/or lubricating means.

A specific example of one application of the invention will now be described with reference to the accompanying drawings, in which:

Figure 1 is a diagram showing the general arrangement of one cylinder of the engine, Figure 2 is a front view, partly in section, showing the center cross-head, and Figure 3 is a side view, also partly in section, showing the center cross-head.

The engine forming the subject of this example is an opposed piston, single-acting, two-stroke cycle diesel marine engin. The engine has several cylinders of similar construction of which only one will be described. The engine has a lower piston 4 connected to a center throw 5 of a crankshaft and an upper piston 6 which is attached to a beam 7 which is connected by side rods 8, cross-heads 9 and connecting rods 10 to two side throws 11 of the same crank shaft.

The lower piston 4 has a piston rod 13 which is attached to a centre cross-head 12 and there is a centre connecting rod 14 which is articulated to this cross-head and to the crank throw 5. Attached to the lower end of the piston rod 13 there is a transverse cross-head pin 15 of the form described above. That is, the centre portion of the pin has three flat faces 15a, 15b and 15c at right angles and a convex arcuate surface 16 opposite to the centre face 15b. The end portions 15d of the pin are of cylindrical form. The centre flat face 15d is attached to the end of the piston rod 13 by four studs 17 passing through an enlarged foot 18, on the rod. The flat face 15c is secured to the cross-head shoe 12a which is guided for rectilinear motion by guide 21 and a bracket 19 carrying a connection 20 for coolant liquid for the piston is attached to the face 15a, opposite to the shoe.

The upper end 14a of the connecting rod 14 is enlarged and is formed with a generally flat face 14c perpendicular to the axis of the rod. Attached to this face adjacent opposite sides thereof, there are two bearing blocks 22, 23 which receive the ends 15d of the cross-head pin. Between the bearing blocks 22, 23 there is a bearing pad 24 which seats on the flat face 14c and is located by a spigot 25 and socket 26 on the axis of the rod. The pad has a concave bearing surface 24a which mates with the arcuate surface 16 of the center portion of the cross-head pin. The mating surfaces are on the axes of the two rods and accordingly at least a proportion of the piston thrust is transmitted direct to the connecting rod without the introduction of bending or shear forces on the cross-head pin 15. The arcuate length of the pad is limited to the extent necessary to avoid interference between the pad and the cross-head shoe 12a and bracket 19 as the connecting rod oscillates.

Passages 27 for lubricant and/or for coolant may be drilled through the cross-head pin and mate with passages 28 in the pad leading through the connecting rod to the crank-pin bearing.

The bearing pad 25 may be lined with white metal, copper-lead, lead-bronze, aluminium or other bearing metal. The bearing surfaces of the cross-head pin may be hardened, for example by case-hardening or flame-hardening.

It is one advantage of the above construction, in addition to the advantages already indicated, that the length of the cross-head bearings may be reduced in relation to known constructions whereby the effects of any misalignment of the piston and connecting rods are minimized.

It is within the invention to construct the cross-head pin, or the arcuate surface 16, as an integral part of the piston rod. Similarly the pad 25 may be integral with the connecting rod.

I claim:

1. In a piston engine having a piston rod, a connecting rod, a cross-head pin transverse to the axes of the piston rod and conecting rods and to which one end of the piston rod is secured and one end of the connecting rod is articulated, a shoe attached to the cross-head pin and a guide constraining the shoe for rectilinear motion parallel to the piston rod axis, a construction in which the cross-head pin has at its center portion, which is in line with the axis of the piston rod, the cross-sectional shape of a cylinder cut away to form at least two flat faces at right angles, one of said flat faces being perpendicular to the piston rod and seating on the end thereof and the other of said flat faces seating on the shoe, and in which the ends of the cross-head pin are circular in section and the connecting rod has annular bearings which engage over the said end of the cross-head pin to form said articulation thereto and between these bearings an arcuate bearing surface which works on the remaining cylindrical part of the center portion of the cross-head pin opposite to the flat face which is secured to the piston rod.

2. In a piston engine a construction as claimed in claim 1 in which the center portion of the cross-head pin is shaped to provide a third flat face opposite to that to which the shoe is attached and there is a bracket for supporting connections for coolant liquid, attached to said third face.

References Cited in the file of this patent

UNITED STATES PATENTS

| | | |
|---|---|---|
| 844,040 | Oechelhaeuser | Feb. 12, 1907 |
| 1,746,491 | Morgan | Feb. 11, 1930 |
| 1,782,655 | Jameson | Nov. 25, 1930 |